United States Patent [19]

Mitchell et al.

[11] Patent Number: 5,151,397
[45] Date of Patent: Sep. 29, 1992

[54] METHOD OF PRODUCING METAL HALIDE CATALYST

[75] Inventor: Kent E. Mitchell; Stanley J. Marwil, both of Bartlesville, Okla.

[73] Assignee: Phillips Petroleum Company, Bartlesville, Okla.

[21] Appl. No.: 808,785

[22] Filed: Dec. 16, 1991

[51] Int. Cl.$^5$ .................................. C08F 4/64
[52] U.S. Cl. .................... 502/107; 502/108; 502/111; 502/112; 502/113; 502/117; 502/119; 502/125
[58] Field of Search ............... 502/107, 108, 111, 112, 502/113, 117, 119, 125

[56] References Cited

U.S. PATENT DOCUMENTS

| | | | |
|---|---|---|---|
| 3,440,237 | 4/1969 | Mottus | 260/94.9 |
| 3,708,465 | 1/1973 | Dietrich et al. | 260/93.7 |
| 4,130,699 | 12/1978 | Hoff et al. | 526/67 |
| 4,325,837 | 4/1982 | Capshew et al. | 252/429 B |
| 4,326,988 | 4/1982 | Welch et al. | 252/429 |
| 4,410,451 | 10/1983 | Dietz et al. | 502/110 |
| 4,562,168 | 12/1985 | Lee | 502/107 |

*Primary Examiner*—Patrick P. Garvin
*Assistant Examiner*—Brent M. Peebles
*Attorney, Agent, or Firm*—Marianne H. Michel

[57] ABSTRACT

A polymerization catalyst is formed by combining a metal halide compound, a solvent, an effective amount of water to reduce fines and increase particle size, and a transition metal compound to form a first catalyst component and mixing the first catalyst component with a precipitating agent. After mixing the first catalyst component and the precipitating agent, the mixture can be heated to a temperature higher than the mixing temperature to reduce polymer fines. In the alternative prepolymer can be deposited on the catalyst(s) in an amount effective to reduce polymer fines. Optionally the catalyst can be treated with a halide ion exchanging source. The catalyst can also be combined with an organometallic cocatalyst.

18 Claims, No Drawings

METHOD OF PRODUCING METAL HALIDE CATALYST

BACKGROUND OF THE INVENTION

The invention relates to a method of producing a metal halide/transition metal catalyst.

In the production of polyolefins, such as for example polyethylene, polypropylene, ethylene-butene copolymers etc., an important aspect of the various processes and catalysts used to produce such polymers is the productivity. By productivity is meant the amount of yield of solid polymer that is obtained by employing a given quantity of catalyst. If the productivity is high enough, then the amount of catalyst residues contained in the polymer is low enough that the presence of the catalyst residues does not significantly affect the properties of the polymer, and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition to productivity of a catalyst, another important aspect of a catalyst is the catalyst particle size. An increase in particle size improves settling characteristics of the catalyst which can be desirable in both catalyst production and in feeding the catalyst to a loop reactor.

SUMMARY OF THE INVENTION

Accordingly, an object of this invention is a process to produce a catalyst.

Another object of the invention is a process to prepare a catalyst and a polymerization process in which the polymer produced contains catalyst residues in an amount so that catalyst residue removal is unnecessary.

Another object is a process to produce a catalyst characterized by high productivity and increased particle size, i.e. low catalyst fines.

According to the invention a process to prepare a catalyst is provided which comprises preparing a metal halide solution by mixing a metal halide compound, a solvent, and water; contacting the metal halide solution with a transition metal compound to produce a first catalyst component; and contacting the first catalyst component with a precipitating agent to form the catalyst; wherein said water is present in an amount sufficient to increase particle size of the catalyst.

Further according to the invention, the thus produced catalyst can be contacted with a halide ion exchanging source.

Further according to the invention, a portion of the supernatant from the solid catalyst slurry can be decanted, and the remaining slurry can be heated to a higher temperature to produce some additional amount of precipitate, thus producing a heat treated catalyst.

Further according to the invention olefin prepolymer can be deposited on the solid catalyst, thus producing a prepolymerized catalyst.

Further according to the invention, an organometallic cocatalyst can be employed.

DETAILED DESCRIPTION OF THE INVENTION

According to the invention, a process to produce a catalyst is described, wherein the catalyst is produced by reacting a solution of metal halide, to which a small but effective amount of water has been added, with a transition metal to give a first catalyst component which is then contacted with a second catalyst component which is a precipitating agent as herein described to produce a solid catalyst slurry. The solid catalyst slurry can then be heated to produce a heat treated catalyst. Optionally the catalyst can then be treated with a halide ion exchanging source as herein defined.

In the alternative the solid catalyst can have prepolymer deposited thereon to produce a prepolymerized catalyst. Alternatively, the solid catalyst can be treated with a halide ion exchanging source, and then have prepolymer deposited thereon. Alternatively, the solid catalyst can have prepolymer deposited thereon, be subsequently treated with a halide ion exchanging source, and then have further prepolymer deposited thereon.

FIRST CATALYST COMPONENT

Metal Halide

The metal halide compound is selected from metal dihalides and metal hydroxyhalides and the metal of the metal halide compound is selected from Group IIA and Group IIB metals of the Mendeleev Periodic Table. As used herein by the term "Mendeleev Periodic Table" is meant the Periodic Table of the Elements as shown in the inside front cover of Perry, *Chemical Engineer's Handbook*, 4th Edition, McGraw Hill & Co. (1963).

As noted above, the metal halide compound is selected from metal dihalide compounds and metal hydroxyhalide compounds, and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride.

Preferably, the metal halide employed in making the first catalyst component is selected from the group consisting of magnesium dihalides and magnesium hydroxyhalides. Examples of what is meant by magnesium dihalides are $MgCl_2$, $MgF_2$, $MgI_2$, $MgBr_2$. Examples of what is meant by magnesium hydroxyhalides include $Mg(OH)Cl$, $Mg(OH)Br$, $Mg(OH)I$. It is also within the scope of the invention to use metal halides complexed with one or more electron donors, such as compounds of the formula $MgCl_2 nED$ wherein ED is electron donor. Examples of typical electron donors are water, ammonia, hydroxylamines, alcohols, ethers, carboxylic acids, esters, acid chlorides, amides, nitriles, amines, dioxane, and pyridine. Examples of some specific magnesium halide complexes include $MgCl_2.H_2O$, $MgCl_2.2H_2O$, $MgCl_2.6H_2O$, $MgCl_2.4H_2O$, $MgBr_2.2H_2O$, $MgBr.H_2O$, $MgBr_2.4H_2O$, $MgBr.6H_2O$, $MgI_2.8H_2O$, $MgI_2.6H_2O$, $MgCl_2.6NH_3$, $MgCl_2 NH_3$, $MgBr_2.2NH_3$, $MgI_2.6NH_3$, $MgI.NH_3$, $MgCl_2.2NH_2OH.2H_2O$, $MgCl_2.6CH_3OH$, $MgCl_2.6C_2H_5OH$, $MgCl_2.6C_3H_7OH$, $MgCl_2.6C_4H_9OH$, $MgBr_2.6C_3H_7OH$, $MgCl_2.CH_3OH$, $MgCl_2.(C_2H_5)_2O$, $MgCl_2.6CH_3CO_2H$, $MgCl_2.2CH_3CO_2C_2H_5$, $MgBr_2.2C_6H_5CO_2C_2H_5$, $MgBr_2.4CO(NH_2)_1$, and $MgI_2.6CH_3CONH_2$, $MgBr_2 \cdot 4CH_3CN$, $MgCl_2 \cdot 3C_2H_4(NH_2)_2$, $MgCl_2 \cdot 2N(C_2H_4O)_3$, $MgCl_2 \cdot 2C_6H_5NH_2 \cdot 6H_2O$ and $MgBr_2 \cdot 6C_6H_5NH_2$.

It is also possible to use mixed compositions containing the metal halide. Examples include compositions such as $MgCl_2 \cdot MgO \cdot H_2O$, $MgCl_2 \cdot 3MgO \cdot 7H_2O$, and $MgBr_2 \cdot 3MgO \cdot 6H_2O$. While metal hydroxyhalide compounds are known in the art, they are not as common and as readily available as metal dihalide compounds; therefore, metal dihalides are preferred.

It is currently preferred to use magnesium dihalides of the commercial variety which are conventionally called "anhydrous" but which are in fact magnesium dihalide hydrates containing 1 molecule or less of water per molecule of magnesium dihalide. "Commercial anhydrous" magnesium dichlorides are a typical example. Of the magnesium dihalides, magnesium dichloride is particularly preferred because it is readily available and relatively inexpensive and has provided excellent results.

It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention if the metal halide compound is in a fine particulate form, that is, polymer productivity, for example, is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128–134 (1973).

Solvents and Water

The metal halide compound is mixed with a suitable dry (essential absence of water) solvent or diluent, which is essentially inert to these components and the product produced. By the term "inert" is meant that the solvent does not chemically react with the dissolved components such as to interfere with the formation of the product or the stability of the produce once it is formed.

As noted above dry solvents are employed. In the inventive process a small but effective amount of water effective to increase catalyst particle size is added to the solvent before or after the addition of the metal halide. Generally, the amount of water added to the solvent can vary over a broad range. Normally, the final water concentration can be within the range of from about 6 ppm to about 600 ppm, preferably from 15 ppm to 300 ppm to produce a catalyst with larger particle size without reduction in catalyst productivity.

Suitable solvents or diluents include, for example, n-pentane, n-hexane, n-heptane, methylcyclohexane, toluene, and xylenes. Aromatic solvents can be preferred, such as for example, xylene, because the solubility of the metal halide compound and the transition metal compound is higher in aromatic solvents as compared to aliphatic solvents, although for other reasons aliphatic solvents can be preferred. For example, when solvent is removed from the solid catalyst by decantation or by filter stick, somewhat faster settling rates can be obtained with aliphatic rather than with aromatic solvents. Generally, the amount of solvent or diluent employed can be selected over a broad range. Usually the amount of solvent or diluent is within the range of about 1 to about 100, more preferably 20 to 100 cc per gram of metal dihalide.

In addition to the above noted solvents or diluents, more polar solvents or diluents such as nitrobenzene and halogenated hydrocarbons, e.g. methylene chloride, chlorobenzene and 1,2-dichloroethane can be used, particularly when producing compositions of the invention having a molar ratio of the transition metal compound to the metal dihalide compound of other than 2:1.

In addition, normal saturated alkanols, such as, for example, ethanol and n-butanol, and saturated ethers particularly saturated cyclic ethers such as, for example, tetrahydrofuran, can be used alone or in combination with the previously mentioned solvents or diluents in producing catalyst compositions according to the invention. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride. Other suitable mixtures of two or more of the above solvents to solubilize the reagents of the first catalyst component can of course also be used and can be readily determined by one of ordinary skill in the art. Usually the amount of solvent or diluent is within the range of about 20 to about 100 cc per gram of metal dihalide.

Conditions

The temperature at which the metal halide, solvent and water are brought into contact can vary over a wide range, typically temperatures within the range of from about $-100°$ C. to about $150°$ C., and preferably from about $0°$ C. to about $80°$ C., and most preferably from $20°$ C. to about $50°$ C. The pressure employed during the contacting step does not appear to be a significant parameter. Generally the pressure employed is within the range or about 0 to about 50 psig, preferably in the range of about 5 to about 20 psig, and most preferably in the range of 5 to 10 psig. Generally, the time required for contacting these two components is within the range of about 1 minute to about 5 hours, although in most instances, a time within the range of 5 minutes to 1 hour is sufficient, and most preferably 10 minutes to 30 minutes.

Transition Metal

The transition metal of the transition metal compound is selected from the Group IVB and Group VB transition metals of the Mendeleev Periodic Table and the transition metal is bonded to at least one atom selected from oxygen, nitrogen and sulfur, and said oxygen, nitrogen and sulfur atoms are in turn bonded to a carbon atom of a carbon containing radical.

The transition metal of the transition metal compound noted above is generally selected from titanium, zirconium, and vanadium although other transition metals can be employed. Excellent results have been obtained with titanium compounds and they are preferred. Some of the titanium compounds suitable for use include for example titanium tetrahydrocarbyloxides, titanium tetramides, titanium tetraamides and titanium tetramercaptides. Examples of such compounds include mono, di, and trihalo substituted titanium compounds in which the remaining valences are filled with the previously enumerated radicals. The preferred titanium compounds are the non-halogenated titanium compounds in which each valence is filled by one of the enumerated radicals.

Other suitable transition metal compounds include for example zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula

wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetraethoxide is particularly preferred because of the excellent results obtained employing this material. Titanium tetraethoxide is also generally available at a reasonable cost.

The molar ratio of the transition metal compound to the metal halide compound can be selected over a relatively broad range. Generally, the molar ratio is within the range of about 10:1 to about 1:10, the most preferred molar ratios are within the range of 2:1 to 1:2.

Conditions

The temperature at which the metal halide and the transition metal compound are brought into contact can vary over a wide range, typically temperatures within the range of from about −100° C. to about 50° C., and preferably from about 10° C. to about 40° C., and most preferably from 20° C. to about 30° C.

The temperature employed in the heating step after the metal halide and the transition metal compound are brought into contact can also be selected over a broad range. Normally the two components are subjected to a temperature within the range of about 15° C. to about 150° C. when the heating step is carried out at atmospheric pressure. Obviously, the heating temperatures employed could be higher if the pressure employed is above atmospheric pressure. The pressure employed during the heating step does not appear to be a significant parameter.

Generally, the time required for heating these two components together is within the range of about 5 minutes to about 10 hours, although in most instances, a time within the range of 15 minutes to 3 hours is sufficient. Following the heating operation, the resulting solution can be filtered to remove any undissolved material or extraneous solid, if desired.

Precipitating Agent

The catalysts of the present invention are made up of two components. The first catalyst component comprises a composition of matter as described above and the second catalyst component comprises a precipitating agent. When contacting the first catalyst component and the precipitating agent (second catalyst component), a solid catalyst slurry is formed.

The precipitating agent is selected from the group consisting of organometallic compounds in which the metal is selected from metals of Groups I, II and III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

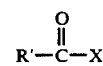

wherein R' is an alkyl, aryl, cycloalkyl group or combination thereof containing from 1 to about 12 carbon atoms and X is a halogen atom.

Some organometallic compounds in which the metal is selected from metals of Group I, Group II, and Group III of the Mendeleev Periodic Table suitable for use as the precipitating agent include, for example, lithium alkyls, Grignard reagents, dialkyl magnesium compounds, dialkyl zinc compounds, organoaluminum compounds, etc.

The organometallic compound used as a precipitating agent is generally an organoaluminum compound which includes for example, dihydrocarbylaluminum monohalides of the formula R"$_2$AlX, monohydrocarbylaluminum dihalides of the formula R"AlX$_2$, hydrocarbylaluminum sesquihalides of the formula R"$_3$Al$_2$X$_3$, and trihydrocarbyl aluminums of the formula R"$_3$Al wherein each R" in the above formulas is individually selected from linear and branched chain hydrocarbyl radicals containing from 1 to about 20 carbon atoms per radicals and can be the same or different and each X is a halogen atom and can be the same or different. Some suitable organoaluminum compounds include, for example, triethylaluminum, trimethylaluminum, diethylmethylaluminum, ethylaluminum dibromide, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, and ethylaluminum sesquiiodide. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

Some metal halides and oxygen-containing halides of elements selected from Groups IIIA, IVA, IVB, VA, and VB suitable for use as the precipitating agent preferably include such as for example, aluminum tribromide, aluminum trichloride, aluminum triiodide, tin tetrabromide, tin tetrachloride, silicon tetrabromide, silicon tetrachloride, phosphorous oxychloride, phosphorous trichloride, phosphorous pentabromide, vanadium tetrachloride, vanadium oxytrichloride, vanadyl trichloride, and zirconium tetrachloride.

The hydrogen halides suitable for use as the precipitating agent include hydrogen chloride, and hydrogen bromide.

The organic acid halides suitable for use as the precipitating agent preferably include such as for example, acetyl chloride, propionyl fuoride, dodecanoyl chloride, 3-cyclopentylpropionyl chloride, 2-naphthoyl chloride, benzoyl bromide, and benzoyl chloride.

The molar ratio of the transition metal compound of the first catalyst component to the precipitating agent can be selected over a relatively broad range. Generally, the molar ratio of the transition metal of the first catalyst component to the precipitating agent is within a range of from about 10:1 to about 1:10 and preferably within a range of 2:1 to 1:3 A molar ratio within the latter range usually produces a catalyst which can be employed as an especially active ethylene polymerization catalyst.

It is emphasized that the compositions as herein defined are prepared in an oxygen free system e.g., absence of air as well as a dry system, i.e., absence of water. Generally, a dry box is employed in small preparations as known in the art to prepare the compositions of the present invention usually employing a dry oxygen free nitrogen atmosphere.

Conditions

The temperature employed while contacting the first catalyst component and the precipitating agent as above described can be selected over a broad range. Generally, the temperature employed is within a range of about −100° C. to about 150° C., while temperatures within the range of about 0° C. to about 50° C. were most often employed, most preferably 20° C. to 50° C. Since heat is evolved when the first catalyst component and the precipitating agent are contacted, the mixing rate is adjusted as required and additional cooling is employed if needed in order to maintain a relatively constant mixing temperature. It is noted with respect to contacting the components, that the order of addition is not important and either component can be added to the other or both can be added simultaneously and/or stoichiometrically to a common vessel. After completing the contacting, the resulting solid catalyst slurry is stirred or agitated for a sufficient time, generally within a range of about 15 minutes to about 5 hours, to insure that mixing of the components is complete.

After the precipitating agent has been contacted with the first catalyst component solution, it is preferred to remove at least a portion of the supernatant. The supernatant can be removed in any suitable manner. One technique simply involves allowing the solids to settle and then carefully pouring off the supernatant while being careful not to waste the solids. A preferred technique for removing the supernatant involves the use of a decant tube containing an internal filter that will protect against the loss of desirable solids.

The catalyst slurry can then be subjected to a temperature higher than that used in the contacting of the two components, said temperature being at least 50° C., more generally in the range of about 50° C. to about 150° C., more preferably in the range of about 50° C. to about 110° C., and most preferably in the range of 90° C. to 110° C.

The solid catalyst slurry is maintained at a temperature in that range for a length of time sufficient to result in the formation of some additional amount of precipitate. The length of time needed in order for the heat treatment to give the best results in terms of yield of solids and of final catalyst integrity can be determined by routine experimentation. Typically the heat treatment will be maintained for about 15 minutes to about 5 hours. It is generally preferred to stir or agitate the mixture during the heat treatment. The catalyst thus treated is denoted a heat treated catalyst.

The amount of supernatant withdrawn can vary over a wide range depending upon the results desired. It is currently preferred, however, to decant off about ¼ to about 5/6 of the volume of the supernatant, more preferably ½ to ¾ of the volume. Removing portions of the supernatant results in a reduction in the amount of transition metal remaining in polymers produced with the catalyst. It also results in a more active catalyst. It also results in polymer having lower levels of polymer fines than is obtained using a catalyst prepared without the decanting of the supernatant.

Halide Ion Exchanging Source

After the described heat treatment, the solids can optionally be contacted with a halide ion exchanging source i.e., a compound capable of increasing the halogen content of the solid and capable of increasing the polymerization activity of the solid. Typical examples of halide ion exchanging sources considered to be suitable include compounds having at least one halogen bonded to an element selected from the group consisting of H, S, C, B Si, Sn, Ge, P, Ti, Zr, and V. Some typical examples of such compounds include $CCl_4$, $BCl_3$, $SiCl_4$, $SiHCl_3$, $SnCl_4$, $PCl_3$, benzoyl chloride, acetyl chloride, HCl, $Si_4Cl_{11}$, $C_2H_5SiCl_3$, $CH_3iCl_2H$, $(CH_3)_2SiCl_2$, $Si(OC_2H_5)Cl_3$, $TiCl_4$, $TiBr_4$, $TiI_4$, $ZrCl_4$, $VOCl_3$, $Si_2OCl_6$, $SOCl_2$. It is also possible to use mixtures of halogenating agents. It is currently preferred to use a halide of Ti, Zr, or V. Titanium tetrachloride is especially preferred because it is readily available and produces excellent results.

Although it is not absolutely necessary, it is generally preferred to wash the solids to remove soluble materials prior to contacting the solid catalyst with the halide ion exchanging source. Typically, a hydrocarbon liquid such as n-pentane, n-heptane, cyclohexane, benzene, n-hexane, zylenes, or the like would be used for the washing step.

Generally, treating the solid catalyst with the halide ion exchanging source takes place in a suitable diluent such as a hydrocarbon diluent, for example, n-pentane, n-heptane, cyclohexane, benzene, and xylenes, to facilitate the treating process.

The treating temperature can be selected over a relatively broad range and is normally within a range of about 0° C. to about 200° C. The treating time for the halide ion exchanging source can also be selected over a broad range and generally is within the range of about 10 minutes to about 10 hours.

While the weight ratio of the halide ion exchanging source to the solid catalyst can be selected over a relatively broad range, the weight ratio of the halide ion exchanging source to the solids is generally within a range of about 10:1 to about 1:10 more generally from 7:1 to 1:4.

Following the treatment of the solid catalyst with the halide ion exchanging source, the surplus halide ion exchanging source is removed by washing with a dry (essential absence of water) liquid such as hydrocarbon of the type previously disclosed, n-hexane, or xylene for example. The resulting halogenated catalyst is stored under dry nitrogen.

Cocatalysts

While it may not be necessary in all instances to employ a cocatalyst with the heat treated catalyst of the present invention, the use of cocatalysts is recommended for best results. The organometallic cocatalysts suitable for use in accordance with the invention are the same as the organometallic compounds suitable for use as with transition metal based polymerization catalysts. Some typical examples include organometallic compounds in which the metal is selected from Groups I, II, and III, for example lithium alkyls, Grignard reagents, dialkyl magnesium compounds, dialkyl zinc compounds and organoaluminum compounds. Of the organometallic cocatalysts, the organoaluminum cocatalysts are preferred because of their excellent results. Typical examples are represented by the general formulas $R''AlX_2$, $R''_2AlX$, $R''_3Al_2X_3$, and $R''_3Al$ in which $R''$ is the same as $R''$ defined above. In addition to those described above as suitable for use as the precipitating agent, the organoaluminum compounds of the formula $R''_3Al$ are suitable and include, for example, triisopropylaluminum, tridecylaluminum, trieicosylaluminum, tricyclohexyaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first component is not particularly critical and can be selected over a relatively broad range. Generally, the molar ratio of the organometallic compound of the cocatalyst to the transition metal compound of the first catalyst component is within a range of about 1:100 to about 1500:1. More preferably, the molar ratio is in the range of about 1:20 to about 20:1, and most preferably 1:10 to 10:1 so that the cocatalyst will be present in adequate amounts to initiate polymerization while allowing good control of the reaction.

Catalyst with Prepolymer

In another embodiment of the invention, prepolymer can be prepolymerized onto the composition formed by the reaction between the first catalyst component and the precipitating agent. The prepolymerized catalyst composition thus produced can be recovered and used in polymerization processes in the same manner as described for the catalyst per se.

The prepolymerization step can comprise, as indicated above, prepolymerizing a minor but effective amount of aliphatic olefin onto the precipitate produced by the reaction between the first component and the precipitating agent.

The prepolymerizing step can be performed by any method effective for prepolymerizing polymer onto the precipitate. For example, the precipitating step can be entirely carried out under an olefin atmosphere; or the precipitating step can be carried out by adding a portion of the precipitating agent under a dry inert atmosphere followed by adding another portion of the precipitating agent under an olefin atomosphere; or other variations can be employed by one skilled in the art in accordance with the invention.

Preferably, the prepolymerizing step is carried out by adding the precipitating agent under an olefin atmosphere, for example, ethylene, to the first component, with stirring, and recovering the precipitate, preferably with washing although not necessarily. Prepolymerized catalysts prepared in this manner provide low fines content polymer when used in polymerization.

The inventive process can include the step of polymerizing a small amount of olefin as hereinafter described onto the precipitated solid catalyst following the precipitation step and/or onto the catalyst following the treatment with the halide ion exchanging source. The polymer thus formed on the precipitate and/or on the catalyst is herein denoted prepolymer for convenience; the process of depositing polymer on the catalyst is denoted prepolymerization; and a catalyst having polymer deposited thereon is denoted a prepolymerized catalyst.

Olefins as herein described, such as, for example, aliphatic mono-1-olefins, for example, ethylene, can be prepolymerized onto the catalysts of the present invention without great difficulty. However, such prepolymerizations require not only an adequate amount of cocatalyst as herein described for polymerization using the catalysts of the invention, for example, triethylaluminum, but also a substantive time to allow prepolymerization to proceed. The amount of cocatalyst required can be readily determined according to the invention from the description and the examples set out below.

The monomer which is utilized for prepolymerization can be the same as or different from the monomer used in polymerization as set out herein. Preferably the same monomer is used for convenience. The aliphatic mono-1-olefin used for prepolymerized catalysts can have from 2 to about 18 carbon atoms per molecule and preferably between 2 and 10 carbon atoms per molecule. Prepolymerization can also use conjugated diolefins, preferably such as having from 4 to 8 carbon atoms per molecule. Thus, the olefin can include such as, for example, ethylene, propylene, 1-butene, 1-pentene, 1-hexene, 1-heptene, 1-octene, 1-nonene and 1 decene and mixtures of one or more thereof. When ethylene homopolymer is to be produced with the invention catalyst, generally an ethylene atmosphere is preferred during catalyst preparation. When ethylene copolymers are to be produced with the invention catalyst, it is sometimes desirable to use the same 1-olefin to furnish the atmosphere in catalyst manufacture that will be used in producing the copolymer product. However, this is not required; and other mono-1-olefins or even dienes such as are suitable for polymerization using the invention catalysts set out can also be employed. When prepolymerization is carried out using conjugated diolefins, preferably diolefins having from 4 to 8 carbon atoms per molecule are used. Most preferably ethylene is used for prepolymerization.

There is no exact upper limit to the amount of prepolymer which can be formed on the catalyst except as determined by the practicality of the situation. The lower limit is determined by an amount effective to reduce fines produced during polymerization using the catalyst to an acceptable level. Any amount of prepolymer can be expected in accordance with the invention to at least contribute to the reduction of polymer fines during polymerization using the catalyst. Preferably, however, the prepolymer can be in the range of about 1% to about 50% by weight based upon the weight of the total composition, because it has been found that catalysts having amounts of prepolymer greater than those in this range do not feed well in conventional catalyst feeders. More preferably, the prepolymer can be in the range of about 3% to about 40% by weight based upon the total composition (catalyst and prepolymer or halogenated catalyst and prepolymer), and most preferably between 5% and 20% by weight. Catalyst having prepolymer in these ranges show good feeding characteristics and large reduction of polymer fines. The prepolymerization is further discussed below.

The temperature employed while mixing the first catalyst component and the precipitating agent, when preparing the prepolymerized catalyst, can be selected over a broad range. Generally, the temperature employed is within a range of about $-100°$ C. to about $150°$ C., preferably temperatures within the range of about $0°$ C. to about $30°$ C. were employed, and most preferably $20°$ C. to $30°$ C. Since heat is evolved when the first catalyst component and the precipitating agent are contacted, the mixing rate is adjusted as required and additional cooling is employed if needed in order to maintain a relatively constant mixing temperature.

It is noted with respect to contacting the first catalyst component and the precipitating agent that the order of addition is not important and either component can be added to the other or both can be added simultaneously and/or stoichiometrically to a common vessel. After completing the mixing, the resulting slurry is stirred or agitated for a sufficient time, generally within a range of about 15 minutes to about 5 hours to insure that mixing of the components is complete. It is recommended that the stirring or agitation be carried out whereby the slurry is maintained at the mixing temperature for the first 5 to about 30 minutes after mixing or more preferably from 5 minutes to 20 minutes. Thereafter, stirring can be discontinued and the solid product recovered by filtration or decantation. The product can then be washed with a suitable material such as a hydrocarbon, e.g., n-pentane, n-heptane, hexane, cyclohexane, benzene, and xylenes, to remove any soluble material which may be present. The product can then be dried and stored under dry nitrogen. The products formed in this manner are designated as prepolymer treated catalyst as previously described.

The olefin atmosphere can be provided by purging the catalyst preparation vessel with olefin and then containing the addition of olefin to provide in the vessel from about 1 psia, or even lower, more preferably from about 10 to about 1000 psia (0.069-6.9 MPa) since at much less than about 10 psia the concentration of dissolving olefin in the solution is negligible and higher pressures can require high pressure equipment. Preferably, the pressure is from 15 to 100 psia (0.10-0.69 MPa) of the olefin since pressures in this range provide a good, controllable reaction consistent with good deposition of prepolymer on the catalyst.

In one embodiment of the invention, the prepolymerized catalyst composition formed by the reaction between the first catalyst component and the precipitating agent component can be recovered after deposition of prepolymer thereon and used in polymerization preferably in combination with a cocatalyst comprising an organometallic compound as herein defined.

According to another aspect of the invention, catalyst which has had prepolymer deposited thereon can be treated with a halide ion exchanging source as described above, such as, for example, a halide of a transition metal in order to produce a catalyst of enhanced activity. One example of a preferable halide ion exchanging source of those set out generally above is titanium tetrachloride, because titanium tetrachloride is readily available and produced excellent results. In general the treatment of prepolymerized catalyst with the halide ion exchanging source can be carried out as indicated above for the treatment of nonprepolymerized catalyst. However, to some extent, the temperature at which the halide ion exchanging treatment is carried out will depend upon the time when prepolymer is deposited on the catalyst. Thus when prepolymer is applied to the catalyst prior to the halide ion exchanging source treatment step, then the temperature used during the halide ion exchanging source treatment is preferably generally below about $100°$ C., more preferably from about $15°$ C. to about $90°$ C., most preferably from $15°$ C. to $50°$ C., to avoid dissolving the prepolymer in the hydrocarbon solution containing the halide ion exchanging source, such as, for example, titanium tetrachloride. Treating with the halide ion exchanging source at a temperature in the range of $20°$ C. to $30°$ C. is currently particularly preferred for convenience.

According to yet another aspect of the invention, the product obtained by treatment of prepolymerized catalyst with the halide ion exchanging source can have prepolymer deposited thereon, thereby producing halogenated catalyst having prepolymer twice deposited thereon.

According to yet another aspect of the invention, the catalyst composition without prepolymer can be treated with the halide ion exchanging source, the reaction product can have prepolymer deposited thereon in accordance with the invention. For example, the reaction product can be separated from a reaction mix or diluent and prepolymer deposited thereon in accordance with the procedure set forth above for depositing prepolymer on the catalyst compositions.

The resulting product, after drying, can be stored under an inert atmosphere, such as dry nitrogen. It is found in general that the thus treated catalyst can be stored for a month or longer without significant decrease in activity.

While it may not be necessary in all instances to employ a cocatalyst with the prepolymerized catalyst, the use of cocatalysts comprising organometallics is recommended for best results. The organometallic cocatalysts suitable for use in accordance with the invention are the same as the organometallic compounds suitable for use as the precipitating agent of the present invention previously described. Triethylaluminum is preferred since this compound produces excellent results.

The molar ratio of the organometallic compound of the cocatalyst to the transition metal compound of the first component is not particularly critical and can be selected over a relatively broad range. Generally, the molar ratio of the organometallic compound of the cocatalyst to the transition metal compound of the first catalyst component is within a range of about 1:100 to about 1500:1. More preferably, the molar ration is in the range of about 1:20 to about 20:1, and most preferably 1:10 to 10:1 so that the cocatalyst will be present in adequate amounts to initiate polymerization while allowing good control of the reaction.

If desired, any catalyst according to the invention can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of 20:1 to 2:1 and use of a particulate diluent has been found effective to facilitate charging of the catalyst to the reactor.

Reactants

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a slurry process, a solution form process, or a gas phase process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally, the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbons atoms per molecule, and include, for example, styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from 50 to 90 weight percent and the other comonomers are from 50 to 10 weight percent.

In one aspect of the invention, the catalysts of the present invention have been found to be particularly effective for polymerization of mono-1-olefins such as ethylene, as extremely high productivities have been obtained and thus mono-1-olefins such as ethylene are the preferred monomers for use with the catalysts of the present invention. Preferably the ethylene polymers will contain from about 90 to 100 weight percent ethylene and about 10 to 0 weight percent comonomer.

Comonomers most often used are mono-1-olefins having from 2 to 12 carbon atoms and preferably are present in an amount of from 0.4 to 1.0 weight percent. Butene, pentene, hexene, and heptene are currently preferred with hexene being the most preferred.

Polymerization Conditions

The polymerization process according to the present invention employing the catalyst and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is generally within a range of about 20° C. to about 200° C., and preferably from 50° C. to 120° C. Ethylene is then admitted and maintained at a partial pressure within a range of about 70 to about 725 psig (0.5 MPa–5.0 MPa) for best results. At the end of the designated reaction period, the polymerization reaction is terminated and the unreacted olefin and isobutane can be vented. The reactor can be opened and the polymer, such as polyethylene, can be collected as a free-flowing white solid and dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reaction product can be continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, and extrusion of film. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g. high flexural modulus, which is also desirable in many applications. Also, the polyethylene particles produced are characterized by low fines content.

The present invention and its advantages will be further illustrated by the following examples.

EXAMPLES

Example I

A 100 gallons (378 L) Pfaudler reactor substantially free of water and oxygen, was charged with 57 gallons (216 L) of n-hexane and 4000 g of $MgCl_2$ under a nitrogen atmosphere. In Run 101, 10 mls (62 ppm) of distilled water was added, in Run 102, 15 mls (93 ppm) of water was added, and in run 103, no water was added. The mixture was stirred and 38.5 lbs of $Ti(OEt)_4$ were added. The stirred mixture was heated for 1 hour at 100° C. and cooled to 30° C. While maintaining the temperature at about 30° C., 83.5 lbs of ethylaluminum sesquichloride (EASC) were added over a 3 hour period. A part of the supernatant was decanted and the mixture was heated to 100° C. and mixed for 20 minutes. The mixture was cooled to 30° C. and the supernatant liquid was decanted. The solids were first washed with 50 gallons of hexane, and twice more with 40 gallons of hexane. Forty gallons of hexane was mixed with the slurry and 36 lbs of $TiCl_4$ was added. The mixture was stirred for 1 hour at 30° C. The supernatant liquid was decanted and the slurry washed 4 times with 40 gallons of hexane. Settling tests were run to determine particle size of the catalysts. The results are presented in Table I. The results in table I demonstrate that the particle size of the catalyst is dependent on the water added to the catalyst.

It has also been observed in routine runs, that much higher polymer fines were produced when the solvent contained less than 5 ppm water than when the solvent contained 21 ppm water.

TABLE I

| Run No. | Water added PPM | catalyst particle size μ |
|---|---|---|
| 101 | 62 | 33 |
| 102 | 93 | 31.3 |
| 103 | 0 | 26.9 |

Example II

Example II demonstrates the use of a prepolymerized catalyst in the inventive process. A 100 gallons (378 L) Pfaudler reactor substantially free of water and oxygen, was charged with 57 gallons (216 L) of n-hexane and 5600 g of $MgCl_2$ under a nitrogen atmosphere. Fifty mls (310 ppm) of distilled water was added to the $MgCl_2$ solution. Another catalyst was also prepared without adding water to the $MgCl_2$ solution. The mixtures were stirred and 54 lbs of $Ti(OEt)_4$ were added to each. The stirred mixtures were heated for 1 hour at 100° C. and cooled to 30° C. While maintaining the temperature at about 30° C., 117 lbs of ethylaluminum sesquichloride (EASC) were added over a 4 hour period. The solids were first washed with 50 gallons of hexane, and twice more with 40 gallons of hexane. Ethylene was introduced into the reactor twice, at a pressure of 20 psi. Sixteen lbs of EASC were added, followed by 1.6 lbs of ethylene. The prepolymerized catalyst was washed 3 times with 33 gallons of hexane. 36 lbs of $TiCl_4$ were added. The mixture was stirred for 1 hour at 30° C. The slurry was washed with 50 gallons of hexane. The slurry was then washed 4 times with 40 gallons of hexane. The catalyst slurry prepared with the addition of 310 ppm water flowed very poorly, which made catalyst sampling difficult. For this reason a settling test to determine particle size was not run. Based on visual observation in the sampling bottle, the catalyst prepared with water, settled faster than the catalyst prepared without water, therefore indicating larger particle size in the catalyst prepared with water. It was concluded from this example that even though particle size was increased, the water content of 310 ppm was too high for best results with the prepolymerized catalyst.

While this invention has been described in detail for the purpose of illustration, it is not to be construed as limited thereby, but is intended to cover all changes and modifications within the spirit and scope thereof.

That which is claimed is:

1. A process for preparing a catalyst comprising:
   (1) mixing a metal halide compound, a solvent and water to produce a metal halide solution, wherein the metal of said metal halide compound is selected from Group IIA metals and Group IIB metals of the Meneleev Periodic Table and said water is present in an amount sufficient to increase particle size of said catalyst;
   (2) contacting said metal halide solution with a transition metal compound to form a first catalyst component solution; and
   (3) contacting said first catalyst component solution with a precipitating agent to form said catalyst.

2. A process according to claim 1 further comprising, contacting said catalyst with a halide ion exchanging source.

3. A process according to claim 2 further comprising contacting said catalyst with a cocatalyst.

4. A process according to claim 3 wherein
   said contacting in step (3) is carried out at a temperature of from about $-100°$ to about 150° C. and wherein a precipitate and a supernatant are formed; said process further comprising:
   heating said precipitate and at least a portion of said supernatant to a temperature greater than at said contacting temperature, and at least 50° C. for a length of time sufficient to form additional precipitate.

5. A process according to claim 3 further comprising contacting said catalyst with a polymerizable olefin selected from aliphatic mono-1-olefins and conjugated dienes to produce a prepolymerized catalyst having prepolymer deposited thereon in an amount sufficient to reduce polymer fines.

6. A process according to claim 3 wherein
   said metal halide is selected from the group consisting of metal dihalide compounds and metal hydroxyhalide compounds and the metal of the metal halide compound is selected from the group consisting of Group IIA metals and Group IIB metals of the Mendeleev Periodic Table;
   said transition metal is selected from the group consisting of Group IVB and Group VB transition metals of the Mendeleev Periodic Table and the transition metal is bonded to at least one radical selected from the group consisting of hydrocarbyloxides, amides, imides, and mercaptides;
   wherein said precipitating agent is selected from the group consisting of;
   (a) organometallic compounds of Groups I, II, III selected from the group consisting of lithium alkyls, Grignard reagents, dialkyl magnesium compounds, dialkyl zinc compounds, and hydrocarbyl aluminum halides;
   (b) metal halides and oxyhalides of metals of Groups IIIA, IVA, IVB, VA, and VB; and
   (c) hydrogen halides and organic acid halides selected from the group consisting of compounds having the formula

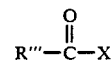

wherein R''' is an alkyl, aryl, or cycloalkyl group or combinations thereof and X is a halide; and wherein said cocatalyst is selected from organometallic compounds in which the metal is selected from Groups I, II, and III.

7. A process for preparing a catalyst comprising:
(1) mixing a metal halide compound, a solvent, and water to produce a metal halide solution; wherein said metal halide compound is selected from the group consisting of magnesium dihalides and magnesium hydroxyhalides and said water is present in an amount of about 6 ppm to about 600 ppm;
(2) contacting said metal halide solution with a titanium compound to form a first catalyst component solution, wherein said titanium compound is selected from the group consisting of hydrocarbyloxides, imides, amides, and mercaptides; and
(3) contacting said first catalyst component solution with an organoaluminum compound to form said catalyst.

8. A process according to claim 7 further comprising contacting said catalyst with a halide ion exchanging source, wherein said halide ion exchanging source is selected from the group consisting of titanium, vanadium, and zirconium tetrahalides.

9. A process according to claim 8 further comprising contacting said catalyst with a cocatalyst comprising an organoaluminum compound.

10. A process according to claim 9 wherein said contacting in step (3) is carried out at a temperature of from about 20° to about 30° C. and wherein a precipitate and a supernate are formed;
said process further comprising:
decanting at least a portion of said supernate; and
heating said precipitate and at least a portion of said supernate to a temperature within the range of about 50° to about 110° C.

11. A process according to claim 9 further comprising contacting said catalyst with a polymerizable olefin selected from the group consisting of aliphatic mono-1-olefins having from 2 to 20 carbon atoms per molecule and conjugated dienes having from 4 to 8 carbon atoms per molecule to produce a prepolymerized catalyst having prepolymer deposited thereon in an amount within the range of from about 1 to about 50 weight percent.

12. A process according to claim 11 further comprising contacting said catalyst with a halide ion exchanging source, wherein said halide ion exchanging source is selected from the group consisting of titanium, vanadium, and zirconium tetrahalides.

13. a process according to claim 9 wherein said metal halide is magnesium dihalide and said solvent is hexane;
said titanium compound is titanium tetraalkoxide;
said precipitating agent is selected from the group consisting of ethylaluminum sesquichloride, ethylaluminum dichloride, and diethylaluminum chloride;
wherein said halide ion exchanging source is selected from the group consisting of titanium tetrahalides; and
wherein said organoaluminum compound is selected from those having the formulas $R'_2AlX$, $RAlX_2$, and $R'_2Al_2X_2$ wherein $R'$ is individually selected from linear and branched chain hydrocarbyl radicals containing 1 to 20 carbon atoms and each X is a halogen atom.

14. A process according to claim 13 wherein said contacting in step (3) is carried out at a temperature of from about 20° to about 30° C. and wherein a precipitate and a supernatant are formed;
said process further comprising:
decanting ¼ to about 5/6 of the volume of said supernatant; and
heating said precipitate and remaining portion of said supernatant to a temperature of about 50° C. to 110° C. for a length of time sufficient to form additional precipitate.

15. A process according to claim 13 further comprising contacting said catalyst with a polymerizable olefin selected from aliphatic mono-1-olefins and conjugated dienes to produce a prepolymerized catalyst having prepolymer deposited thereon in an amount within the range of from about 3 to about 40 weight percent.

16. A process for preparing a catalyst comprising:
(1) mixing magnesium dichloride, hexane and water to produce a magnesium dichloride solution, wherein said water is present in said solution in an amount within the range of from 15 ppm to 300 ppm and said solvent is present in an amount within the range of from 20 to 100 cc per gram of magnesium dichloride;
(2) contacting said magnesium dichloride solution with titanium tetraethoxide to form a first catalyst component solution, wherein the molar ratio of said titanium tetraethoxide to said magnesium dichloride is within the range of from 2:1 to 1:2;
(3) contacting said first catalyst component solution with ethylaluminum sesquichloride to form a solid catalyst, wherein the molar ratio of said ethylaluminum sesquichloride to said titanium tetraethoxide is within the range of from 1:10 to 10:1;
(4) contacting said solid catalyst with titanium tetrachloride, wherein the weight ratio of said titanium tetrachloride to said solid catalyst is within the range of from 7:1 to 1:4.

17. A process according to claim 16 wherein said contacting in step (3) is carried out at a temperature of from about 20° to about 30° C. and wherein a precipitate and a supernatant are formed; and
said process further comprising:
decanting ¼ to about ¾ of the volume of said supernatant;
heating said precipitate and remaining portion of said supernatant to a temperature of about 90° C. to 110° C. for a length of time sufficient to form additional precipitate; and contacting said catalyst with triethylaluminum.

18. A process according to claim 16 further comprising contacting said catalyst with ethylene to produce a prepolymerized catalyst having prepolymer deposited thereon in an amount within the range of from about 5 to about 20 weight percent; and
contacting said catalyst with triethylaluminum.

* * * * *